United States Patent [19]
Holste et al.

[11] Patent Number: 5,756,985
[45] Date of Patent: May 26, 1998

[54] CASH BOX SYSTEM FOR BILL VALIDATOR

[75] Inventors: John H. Holste, Hardin, Ill.; James M. Harr, Jr., O'Fallon, Mo.

[73] Assignee: Coin Acceptors, Inc., St. Louis, Mo.

[21] Appl. No.: 698,504

[22] Filed: Aug. 15, 1996

Related U.S. Application Data

[63] Continuation-in-part of Ser. No. 627,369, Apr. 4, 1996.

[51] Int. Cl.$^6$ ............... G06K 13/00; G06K 13/30; B65H 5/22; G07F 7/04
[52] U.S. Cl. ............... 235/475; 235/476; 235/481; 271/3.15; 194/206
[58] Field of Search ............... 235/475, 476, 235/481; 271/3.15; 194/206, 211

[56] References Cited

U.S. PATENT DOCUMENTS

| | | | |
|---|---|---|---|
| 3,655,186 | 4/1972 | Bayha | 271/88 |
| 3,656,615 | 4/1972 | Ptacek | 209/73 |
| 3,917,260 | 11/1975 | Okkonen et al. | 271/181 |
| 3,918,359 | 11/1975 | Hennells et al. | 100/52 |
| 4,678,072 | 7/1987 | Kobayashi et al. | 194/206 |
| 4,775,824 | 10/1988 | Barnes et al. | 318/567 |
| 4,809,966 | 3/1989 | Kobayashi et al. | 271/181 |
| 4,809,967 | 3/1989 | Kondo | 271/181 |
| 5,322,275 | 6/1994 | Gardellini et al. | 271/306 |
| 5,333,714 | 8/1994 | Watabe et al. | 194/206 |
| 5,388,817 | 2/1995 | Chang | 271/180 |
| 5,419,423 | 5/1995 | Ishida et al. | 194/206 |
| 5,421,443 | 6/1995 | Hatamachi et al. | 194/206 |
| 5,489,014 | 2/1996 | Menoud | 194/211 |
| 5,564,545 | 10/1996 | Suzuki | 194/206 |

FOREIGN PATENT DOCUMENTS

0665520A2  4/1995  European Pat. Off. .

OTHER PUBLICATIONS

Document entitled "BA30 Bill Acceptor Operation and Service Manual" authored by Coin Acceptors, Inc., printed in U.S.A., Mar. 1995.

*Primary Examiner*—Michael L. Gellner
*Assistant Examiner*—Daniel Chapik
*Attorney, Agent, or Firm*—Cohn, Powell & Hind

[57] ABSTRACT

An improved cash box system for a bill validator (11) which includes bill inlet (16) a sensor (OS) associated with the opening, a bill transporting assembly (21) and a bill stacking assembly (30). A cash box (10) associated with the bill validator (11) receives bills (B) from the bill stacking assembly (30) when the stacker motor (M2) is activated. A processing system (100) measures the current draw of the stacker motor (M2) and compares it to a predetermined limit of the current draw to determine whether the cash box (10) is full, when a bill is placed in the bill inlet.

7 Claims, 9 Drawing Sheets

CASH BOX SYSTEM FOR BILL VALIDATOR

This application is a continuation-in-part of application Ser. No. 08/627,369, filed on Apr. 4, 1996.

BACKGROUND OF THE INVENTION

This invention relates generally to cash boxes for use in conjunction with bill handling devices for vending machines and the like, and particularly to a cash box which does not require a switch for clearing a cash box full condition.

Devices which transport, validate and stack currency, and particularly bills, are well-known in the vending and entertainment industry. Such devices are often used with vending machines which typically include a bill transport system which validates and delivers bills to a cash box in which the bills are stacked until the cash box is either full or unloaded. A typical conventional cash box is integrally formed with the bill validator or is attached to the bill validator transport system housing. In general, conventional cash boxes are of a fixed size and can only accumulate a certain number of bills according to its size. In addition, once a conventional cash box is in a cash box full condition, it becomes inactive. Some prior art systems employing a removable cash box utilize a switch between the cash box and the bill validator. Activating the switch as, for example, detaching and emptying a full cash box and re-attaching an empty cash box, permits the stacking mechanism to stack and continue stacking until the cash box is once again full. During the stacking operation the current draw is measured and, if the current flow is below a specified limit, the bill validator will continue to operate. When the current draw reaches the specified limit, indicating that the cash box is full, the stacker mechanism becomes inoperative. The inoperative state is maintained until the cash box is emptied and replaced. This again activates the switch and the stacker mechanism. This switching arrangement presents the problem that a manual switch must be activated.

Another device which utilizes a switch is shown in U.S. Pat. No. 4,678,072 (Kobayashi et al.) In this patent a Bill Validating and Accumulating Device is disclosed for the detection of an overload condition in the cash box (accumulator). In this device, the application of a load exceeding a predetermined stacker motor load is determined by detecting whether or not a stacker motor switch has maintained the "on" state for longer than a predetermined time.

Though not a bill validator, U.S. Pat. No. 3,918,359 (Hennells et al.) is of interest in disclosing a fluid operated, electrically controlled Waste Compactor with Adjustable Bag Fill Control. In this device, a compacting ram is controlled by an electrical timer, which corresponds to the extension of the ram, and is retracted to its initial position electrically when hydraulic pressure indicates that the bag is filled to a preselected height. If the pressure reaches a predetermined magnitude prior to time lapse, a pressure switch is activated which returns the ram to the retracted condition. Again, the system relies on electrical switching.

This present invention solves these and other problems in a manner not revealed in the known prior art.

SUMMARY OF THE INVENTION

This cash box for bill handling devices utilizes a switchless method for determining the cash box status. In lieu of using a switch to reactivate the system when the cash box has been emptied, a novel customer clearable method has been developed which recognizes a motor current characteristic in the cycling of the stacker system, such as the current draw, and compares it to a specified motor current characteristic limit to indicate whether the cash box full condition has been terminated, without requiring cycling of a cash box switch.

The present invention is an improvement over devices which utilize a switch between the cash box and the bill validator and require, for example, the removal, emptying, and replacement (cycling) of the cash box to clear the indication that the cash box is full. In the present invention no switch is required and cash box status is indicated by simply sensing the presentation of a bill at the inlet to cycle the stacker motor to determine the current draw, compared to a predetermined current draw.

This bill validator having an improved cash box system comprises a bill validator including a bill inlet opening and a sensor means associated with the said opening, a bill transport means including an electric motor means for transporting a bill to a bill stacking position and a bill stacker means including an electric motor means and means for moving the bill from the bill stacking position; a cash box associated with the bill validator and selectively receiving bills from the bill stacker means. The system also comprises processing means including measuring means for measuring a selected performance characteristic of the stacker motor means, comparator means for comparing said motor current characteristic with a predetermined limit of the same motor current characteristic, means to permit stacking when said limit is not exceeded and means for setting a full status condition to selectively prevent stacking when said limit is exceeded. The system improvement comprises means for determining the full status condition by cycling the stacker motor when the inlet sensor detects a bill in the inlet.

It is an aspect of the invention that the motor current characteristic of the stacker motor means is the current draw.

It is another aspect of this invention to provide that when the current draw exceeds the predetermined limit, the status condition is set to full; and still another aspect to provide that when the current draw does not exceed the predetermined limit, the status condition is reset to not full.

It is another aspect of the invention that the cash box is provided with at least one modular section disposed between the bill validator and the cash box for increasing the cash box capacity.

Another aspect of the invention is to provide an improved method of determining the cash full condition in a bill validator with a bill receiving opening and bill transporting and stacking motors and a cash box, the method comprising the steps of placing a bill in a bill receiving inlet; detecting the presence of the bill and sending a signal to the bill stacker motor; comparing the current draw of the stacker motor with a predetermined limit of the current draw; accepting the bill when the limit is not exceeded, transporting the bill to a stacking position and stacking the bill in the cash box, and setting the cash box full condition to prevent stacking when said limit is exceeded. The improved method comprises determining the full status condition by cycling the stacker motor when a bill is placed in the inlet.

The primary advantage of the present system is that it eliminates the need for a cash box switch and the circuitry associated with such a switch and therefore is more cost effective.

DESCRIPTION OF THE PREFERRED EMBODIMENT

Figure 1:
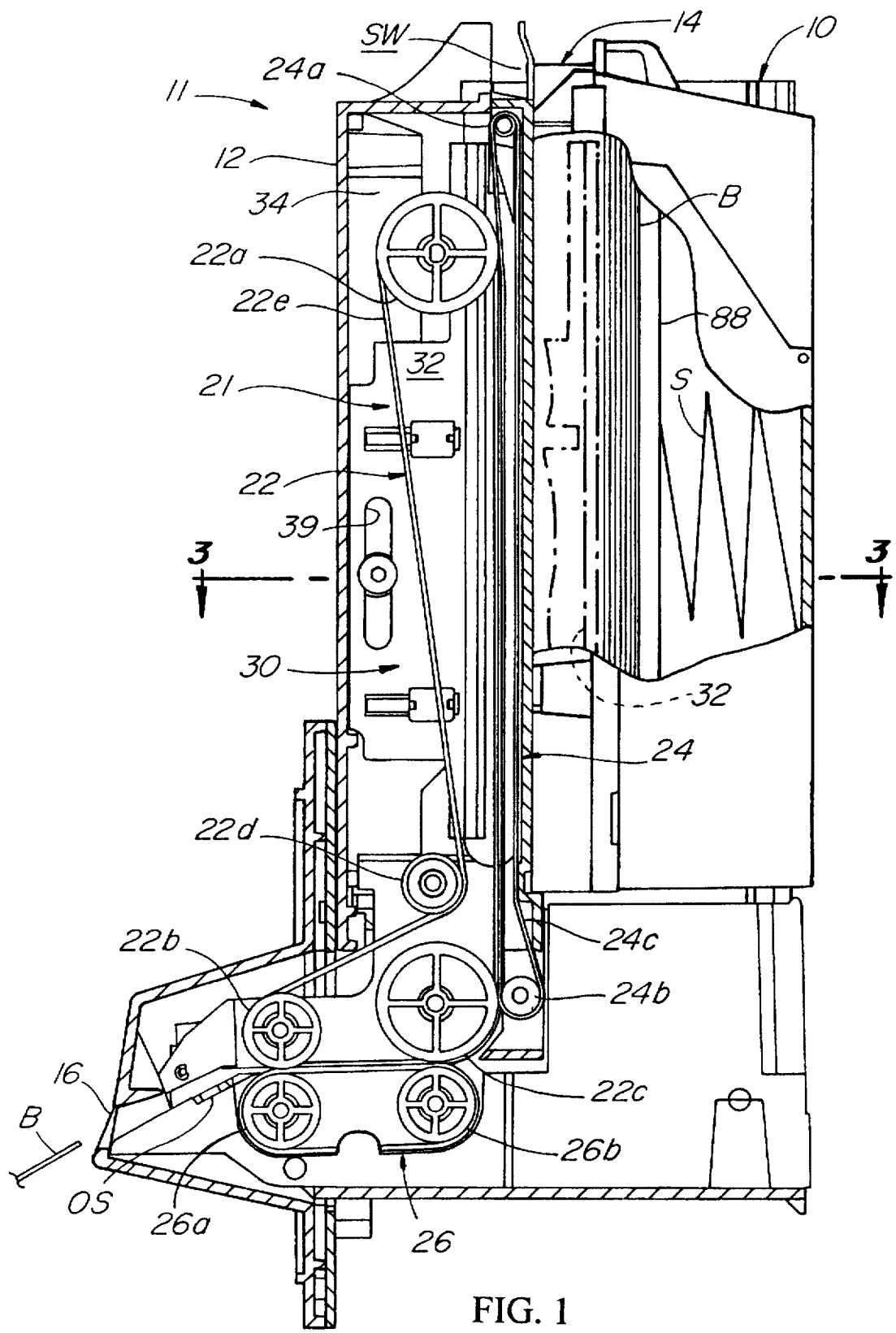
FIG. 1 is a simplified illustration in partial cross section of a bill validator and cash box with the bill stacker mechanism in the retracted position and in part, shown in phantom outline in the cutaway portion of the cash box, in the extended position.
Figure 2:
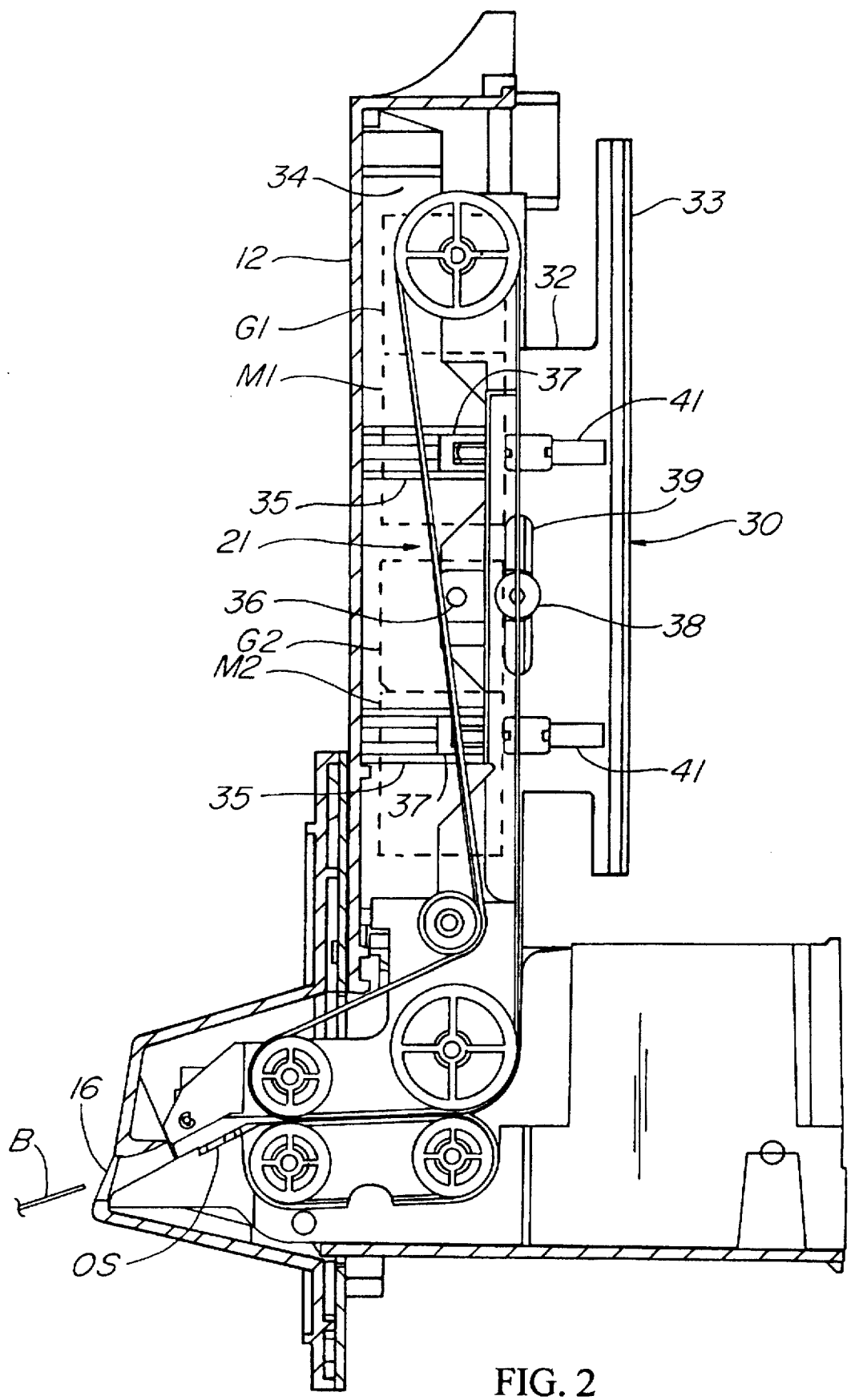
FIG. 2 is a similar view to FIG. 1 with the cash box removed and the bill stacker mechanism in the extended position.
Figure 3:
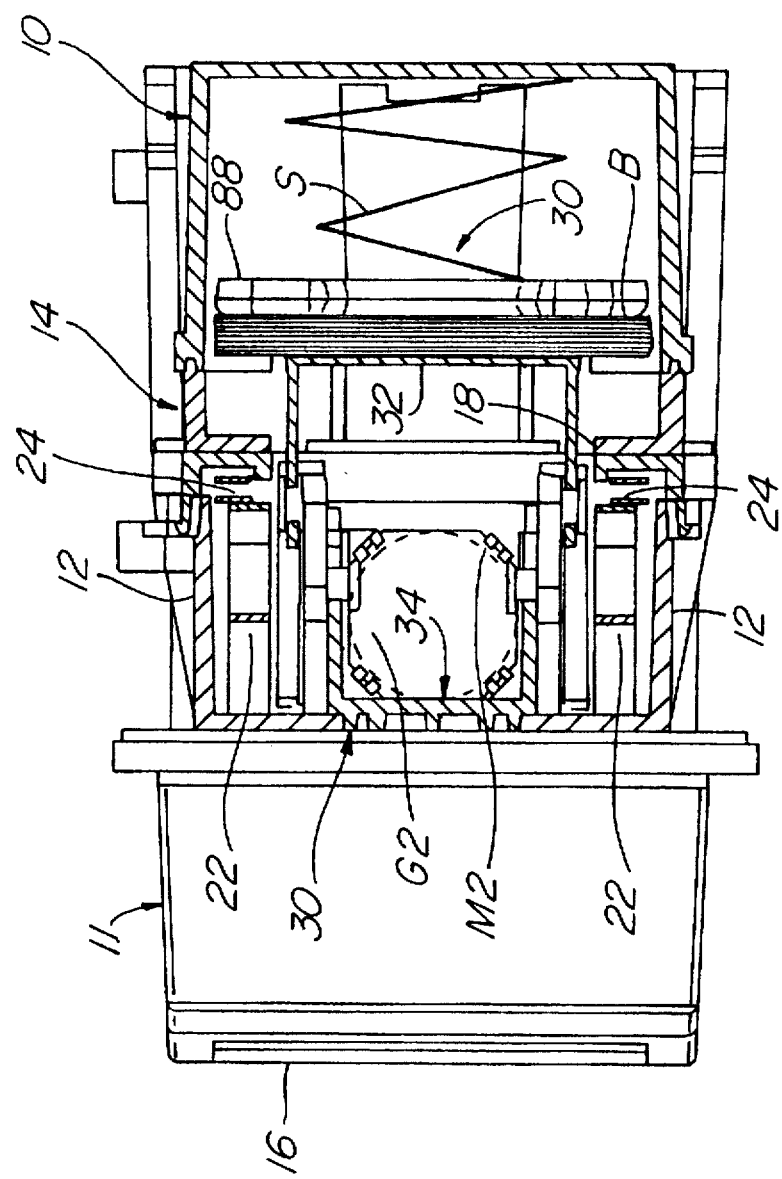
FIG. 3 is a cross section taken on line 3—3 of FIG. 1 showing the bill stacker mechanism in the extended position.

Referring now to the drawings and first to FIGS. 1-3, it will be understood that there is shown, in somewhat simplified form, a bill validator 11 having a cash box 10 attached at the rear end by means of an adaptor frame 14 and having a bill receiving inlet opening 16 at the front end. The bill validator 11 in the embodiment shown includes a housing 12 for a bill transport system 21 comprising essentially three sets of spaced pairs of belt assemblies, namely twin drive belt assemblies 22 and associated twin vertical and horizontal idler assemblies 24 and 26 respectively. The bill validator is similar to that shown in U.S. Pat. No. 5,310,173 which is incorporated herein by reference.

In the embodiment shown herein, the drive belt assemblies 22 are mounted to an interior support 34 and disposed at each side of the access opening 18, each assembly including upper drive pulley 22a, lower pulleys 22b and 22c, intermediate pulley 22d and intermediate endless belt 22e. The vertical idler assemblies 24 are mounted between the housing sidewalls and each assembly includes upper pulley 24a, lower pulley 24b, and an endless belt 24c. The second idler assemblies 26 are mounted to a support below the drive belt assemblies 22 and each includes a pair of pulleys 26a and 26b and an endless belt 26c.

Within the bill validator 11, is a stacker mechanism 30 which includes a U-shaped pusher 32 mounted to the support 34. In FIG. 1 the stacker pusher 32 is shown in the retracted position and in part, shown in phantom outline in the cutaway portion of the cash box, in the extended position. In FIGS. 2 and 3 the stacker pusher is shown in the extended position. The support 34 also provides a mounting for a transport motor M1 and a gearbox G1 which drive the transport system 21 and for a stacker motor M2 and a gearbox G2, the gearbox having a shaft 36 on which are mounted crank arms 38. The pusher 32 includes a vertical slot 39 receiving the outer end of the crank arm 38 so that the pusher is cycled on rotation of the crank arm 38 thereby providing the necessary stoke for the pusher 32 to stack a bill B. In order to provide stability for the horizontal movement of the pusher plate 32, the support 34 also includes, on each side, upper and lower U-shaped rails 35 receiving the inner ends of slide members 37. The outer ends of slide members 37 are received within horizontal slots 4i of the pusher plate 32 and ensure smooth horizontal movement of the pusher plate 32. As shown, the pusher plate 32 may have friction strips or beads 33 which engage the bill B and provide, friction contact between the bill B and the pusher plate to effectively prevent slippage of the bill.

When a bill B is fed into the inlet opening 16 it is recognized by a bill optics sensor OS. If validated, the transport motor M1 is activated and the bill is carried by the transport system 21 into a vertical position aligned with a compressor plate 88 within the cash box adaptor 14. Upon cycling of the pusher plate 32 the bill B is pushed horizontally into the cash box 10 against the action of the cash box spring S.

When the cash box 10 reaches capacity in a prior art system of the type discussed below having a cash box switch, a motor characteristic related to the current of the stacker motor M2, for example the current draw, is measured and when it is greater than a predetermined amount inhibits the acceptance of bills for validation. The system must be reset by the collector/operator emptying the cash box by removal and replacement of the cash box 10 and adaptor 14. A validator of this type may incorporate switching means such as a switch SW shown in FIG. 1.

Prior Art System with Cash Box Switch

Figure 5:
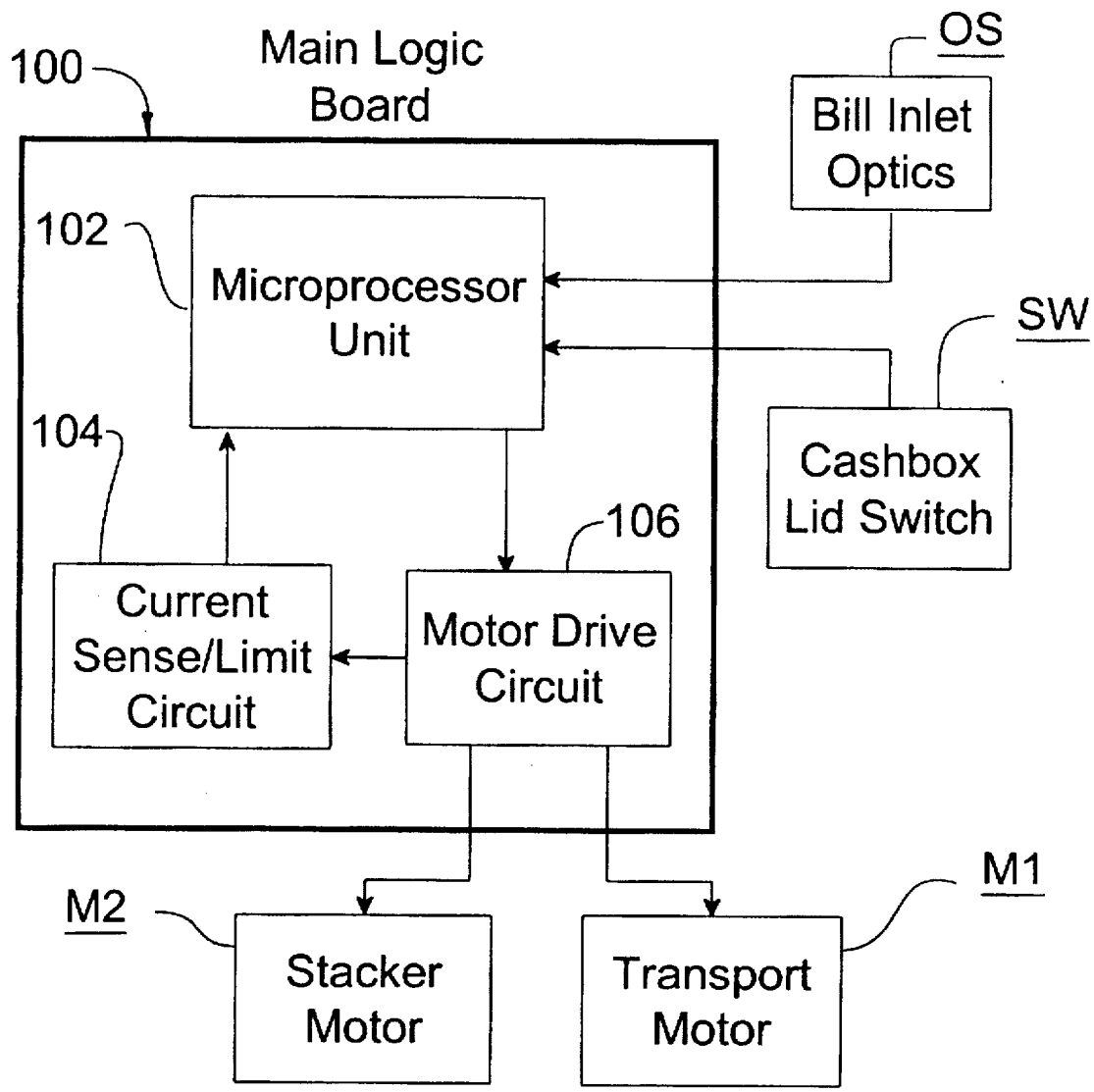
FIG. 5 is a block diagram illustrating a prior art system.
Figure 6:
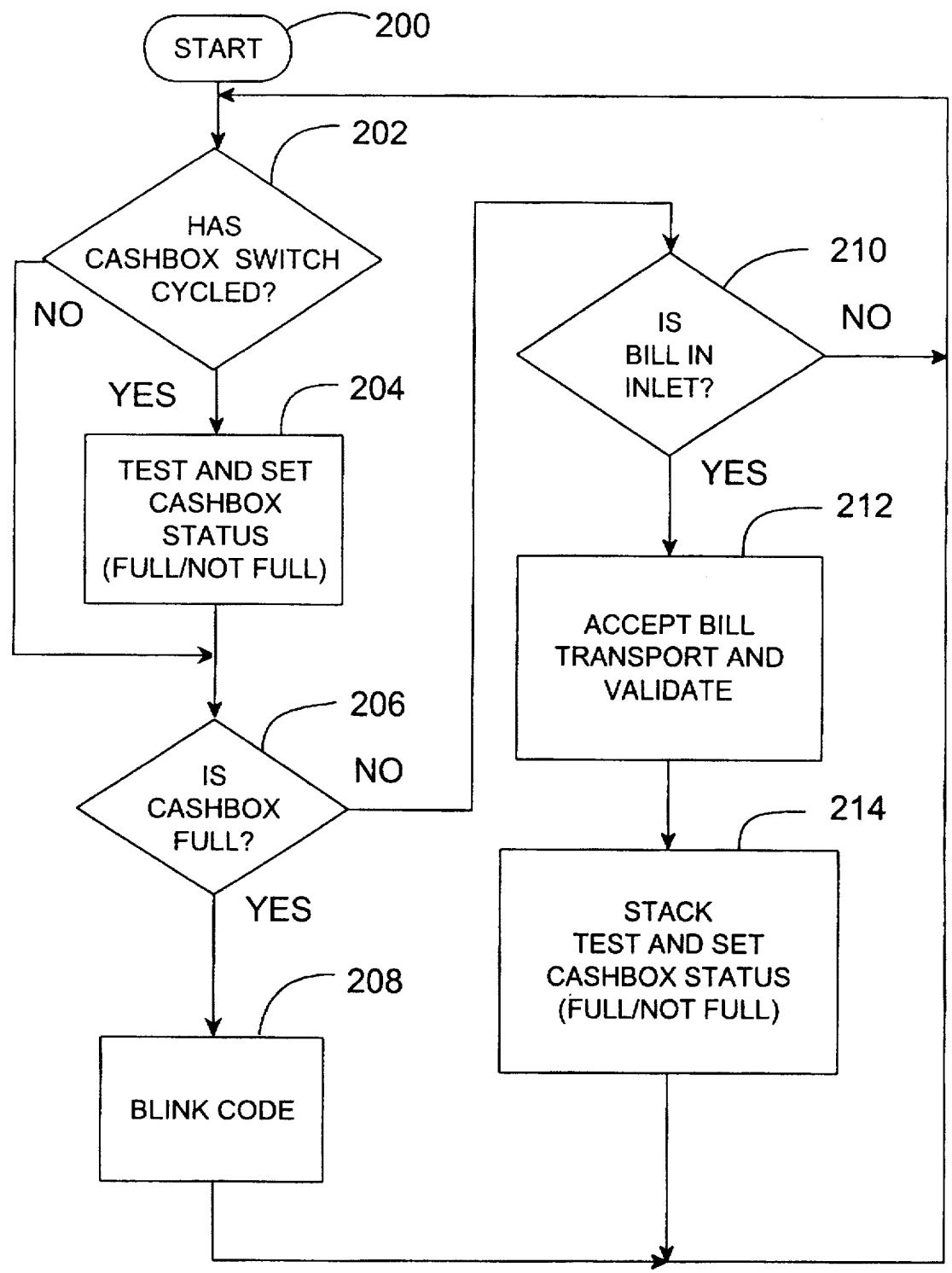
FIG. 6 is a flow chart illustrating the prior art method steps.

FIG. 5 is a block diagram showing the components of a prior art system which includes a main logic board 100 having a microprocessor 102, a current sense/limit circuit 104 and a motor drive circuit 106. These components 102, 104 and 106 provide a measuring means for measuring a stacker motor current characteristic such as the current draw, a comparator means for comparing the current draw with a predetermined limit which, when exceeded, determines that the cash box is full and when not exceeded determines that the cash box is not full. The main logic board 100 receives input signals from the bill inlet optics sensor OS, which is made operative by the cash box lid switch SW, when the switch is cycled. Cycling occurs for example, by removing and replacing the cash box 10; by opening and closing the cash box lid or when the switch SW is operated by a finger. The main logic board 100 provides output from the motor drive circuit 106 to the transport motor M1 and the stacker motor M2. The sequence of events that occurs in this prior art system utilizing the electrical switch SW is described below by reference to the flow chart FIG. 6.

Start routine at block 200 Start.

Flow is to block 202. Has Cash Box Switch cycled?

If Yes, flow is to block 204. Test and Set for Cash Box Status (Full/Not Full), by cycling the stacker motor M2, and flow to block 206. Is Cash Box Full?

If Yes is the response from block 206, flow to block 208, Blink Code, an internal code to signify cash box full to service man, and return to block 202.

If No is the response from block 202, flow is to block 206, Is Cash Box Full?

If No is the response from block 206, flow is to block 210, Is Bill in Inlet?

If No is the response from block 210, return to block 202.

If Yes is the response from block 210, flow is to block 212, Accept Bill, Transport and Validate. Flow is then to block 214, Stack, Test and Set Cash Box Status (Full/Not Full), and return to block 202.

The test result is determined by measuring the stacker motor current. If the current draw exceeds the predetermined amount the cash box status is deemed full and if the current draw does not exceed the predetermined amount the cash box is deemed not full.

With this prior art system, once the cash box is full, all subsequent bills placed in the inlet are ignored and a switch must be recycled, as discussed above, for the system to be reactivated. In the present invention, even when the cash box is full, subsequent bills are not ignored. To the contrary, placing a bill in the inlet causes the stacker motor to cycle and confirm or deny cash box full status, as will now be discussed.

Essentially, in the prior art system if the cash box is full and the cash box switch is cycled, the stacker mechanism will cycle. If the current draw from the stacker motor exceeds the limits, the cash box is assumed to be full. If the current draw is within the limits the cash box is assumed to be not full.

If the cash box is full and the cash box switch is not cycled, a full cash box blink code is activated.

If the cash box, is full and the cash box switch is not cycled, a bill placed in the inlet will be ignored.

If the cash box is not full and a bill is placed in the inlet, the bill is accepted, validated, transported to the stack position and stacked. If the current draw from the stacker motor exceeds the limits, the cash box is assumed to be full. If the current draw is within the limits the cash box is assumed to be not full.

Improved System Without Cash Box Switch

Figure 7:
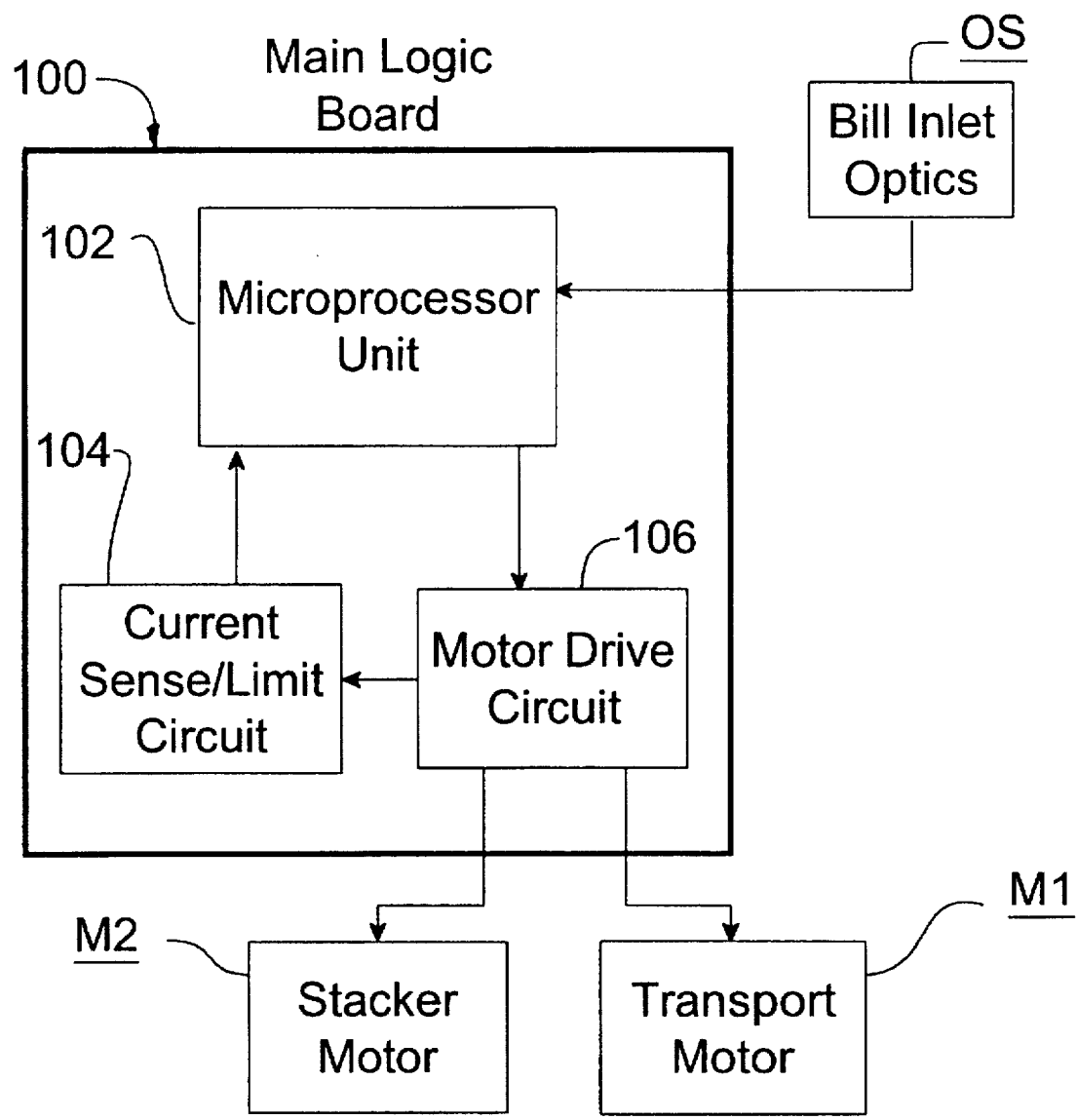
FIG. 7 is a block diagram illustrating a switchless system.
Figure 8:
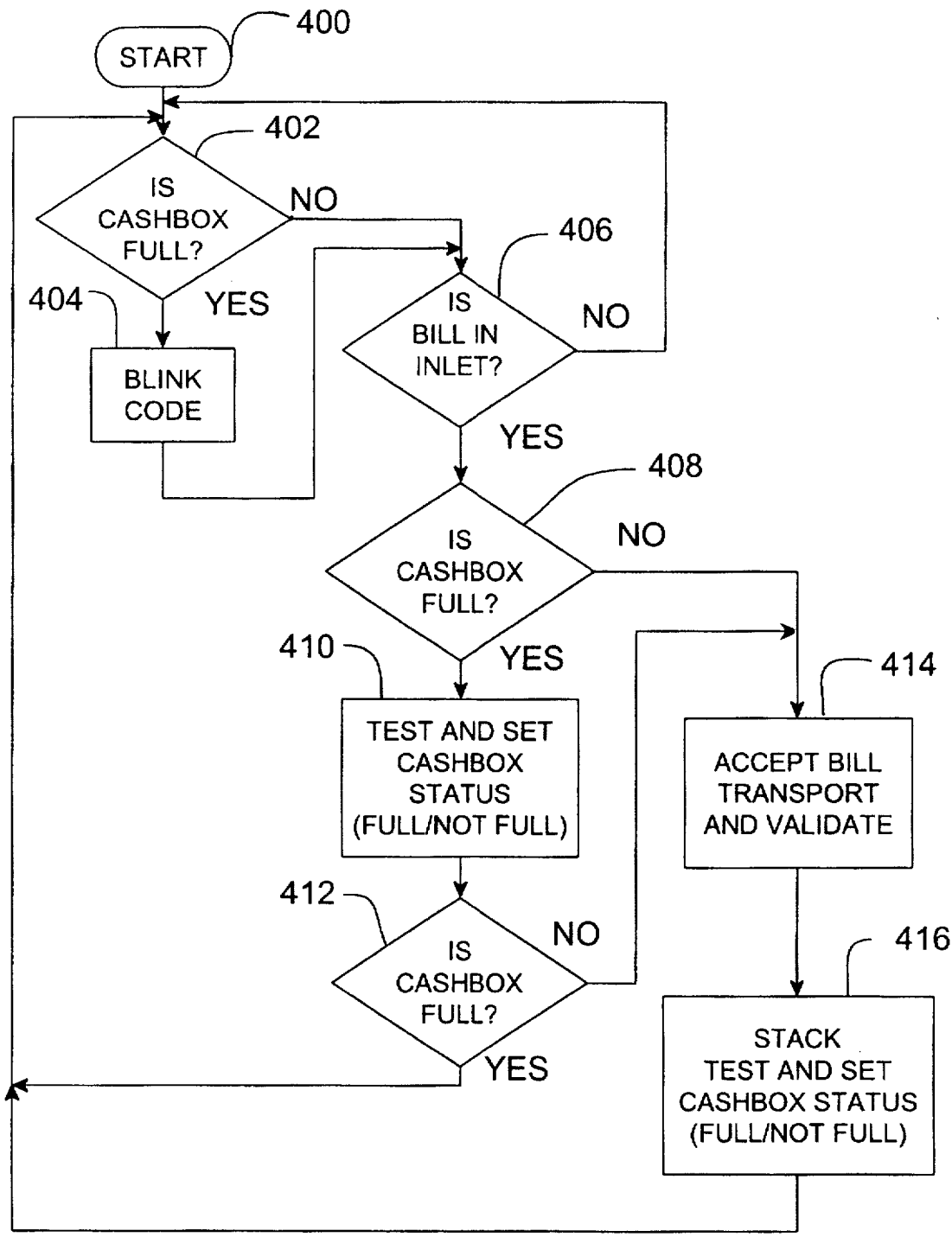
FIG. 8 is a flow chart illustrating the switchless system method steps.

In the present switchless system, essentially the same components are used, as shown in the block diagram FIG. 7, except that the cash box switch SW, or its equivalent, is eliminated completely. However, a different sequence of events occurs as will now be described by reference to the flow chart, FIG. 8.

Start routine at block 400, Start.

Flow is to block 402, Is Cash Box Full?

If Yes, flow is to block 404 Blink Code, an internal code to signify cash box full to service man, and then to block 406, Is Bill in Inlet?

If No is the response from block 406, return to block 402.

If Yes is the response from block 406, flow is to block 408, Is Cash Box Full?

If No is the response from block 408, flow is to block 414, Accept Bill, Transport and Validate. Flow is then to block 416, Stack, Test and Set Cash Box Status (Full/Not Full), and return to block 402.

If Yes is the response from block 408, flow is to block 410, Test and Set Cash Box Status, (Full/Not Full), by cycling stacker motor, and then to block 412, Is Cash Box Full?

If Yes is the response from block 412, return to block 402.

If No is the response from block 412, then flow is to block 414, Accept Bill, Transport and Validate. Flow is then to block 416, Stack, Test and Set Cash Box Status (Full/Not Full), and return to block 402.

If No is the response from block 402, Is Cash Box Full? at the beginning of the routine, then flow is to block 406, Is Bill In Inlet? and from then on continues as outlined above.

As with the prior art system the test result is determined by measuring the stacker motor current. If the current draw exceeds the predetermined amount the cash box status is deemed full and if the current draw does not exceed the predetermined amount the cash box is deemed not full.

However, the improved system of the present invention accomplishes the resetting of the cash box status (Full/Not Full) without the use of a switch to reset status, which is necessary in the prior art as discussed above. The resetting is accomplished in the improved system by cycling the stacker motor M2, before the activation of the transport motor M1 when the bill is sensed at the inlet in conjunction with the cash box "full" status and, if the stacker motor current is below the predetermined limit, then the bill B is validated and transported to the stacking position. When the bill is stacked, the test and set of the cash box status is accomplished at the same time, when the stacker motor is cycled.

Essentially, in the improved system if the cash box is full a full cash box blink code is activated.

If the cash box is full and a bill is in the inlet, the stacker mechanism will cycle. If the current draw from the stacker motor exceeds the limits, the cash box is assumed to be full and the bill will be ignored. If the current draw is within the limits the cash box is assumed to be not full and the bill is accepted, validated, transported to the stack position and stacked. If the current draw from the stacker motor exceeds the limits, the cash box is assumed to be full. If the current draw is within the limits the cash box is assumed to be not full.

If the cash box is not full and a bill is placed in the inlet, the bill is accepted, validated, transported to the stack position and stacked. If the current draw from the stacker motor exceeds the limits, the cash box is assumed to be full. If the current draw is within the limits the cash box is assumed to be not full.

Figure 9:
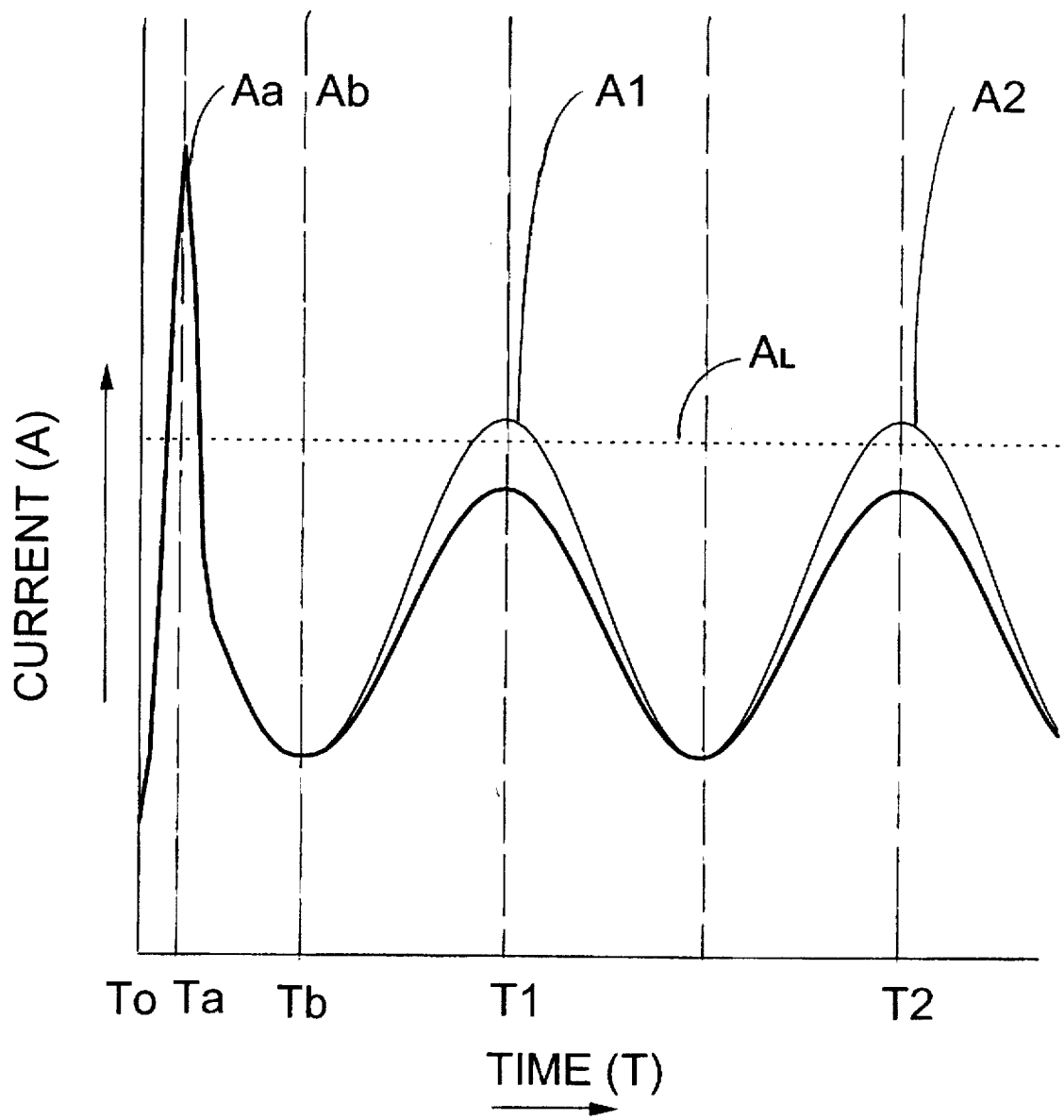
FIG. 9 is a current/time chart for the switchless system.

FIG. 9 is a current/time chart which illustrates the wave form when the stacker motor current draw amperage is compared to a predetermined limit level $A_l$. The initial current surge is shown by peak $A_a$ at time $T_a$. The true start is time $T_b$. The amplitude representing the current draw is measured twice, i.e., at $T_1$ and $T_2$, to allow for the fact that the first reading $A_1$ may be a false reading. If the first peak reading $A_1$ indicates a current above $A_l$ this will not automatically indicate a cash box full condition. If the next peak reading $A_2$ at $T_2$ is below the limit $A_l$, then the cash box full is not indicated. However, if the next peak $A_2$ at $T_2$ is above the limit $A_l$, then the cash box full condition is indicated.

The arrangement described above with reference to the flow chart FIG. 8, in which the switch SW or its equivalent is eliminated, is particularly useful when used in conjunction with a cash box system which is extended lengthwise, as by modular sections, to increase the capacity. A cash box system of this character is shown and described in detail in co-pending, co-owned U.S. patent application Ser. No. 08/627,369 which is incorporated by reference herein. A brief description of such a system is provided below with reference to FIG. 4.

Figure 4:
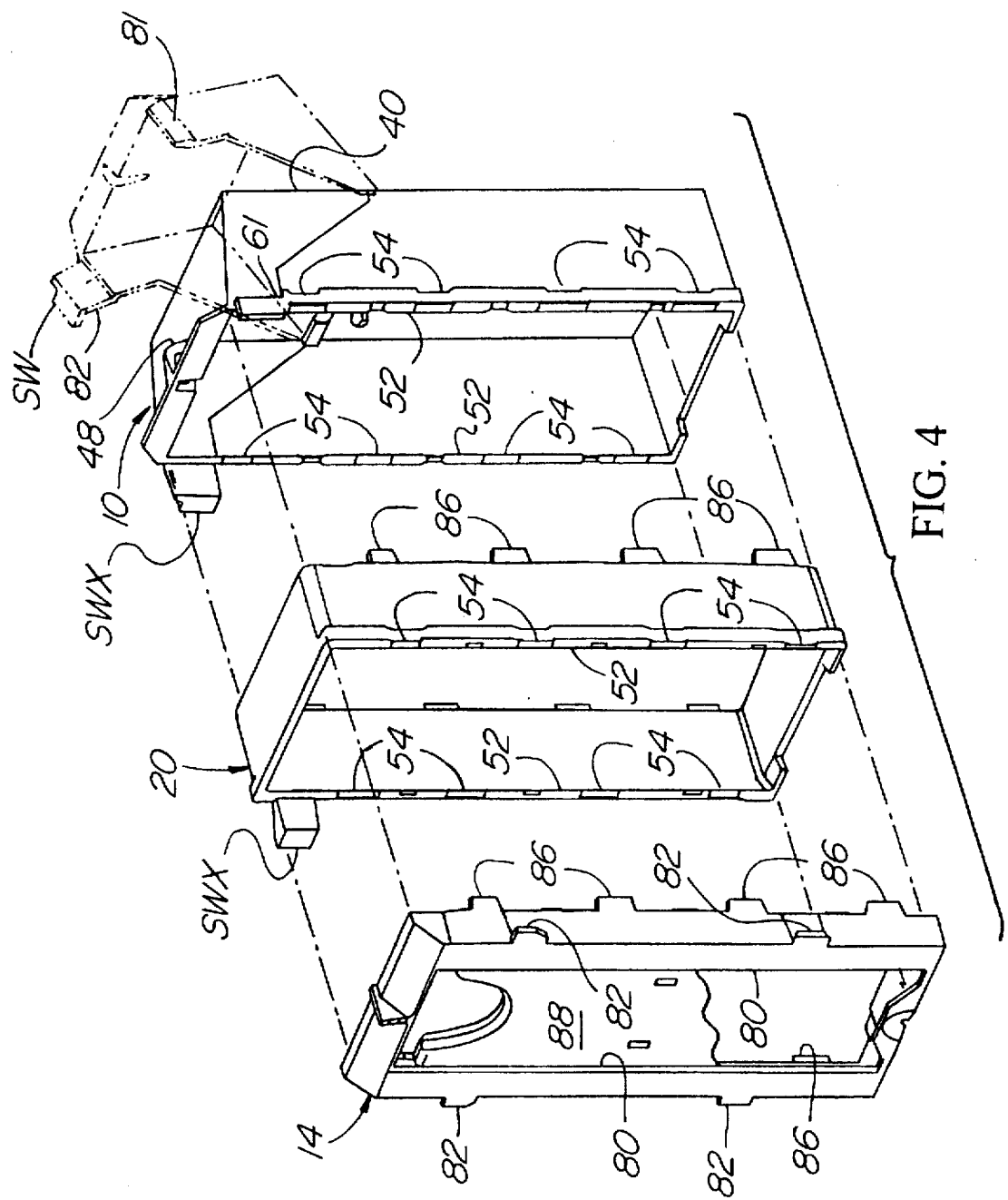
FIG. 4 is an exploded perspective illustrating a bill validator having a modified modular cash box system.

FIG. 4 is an exploded perspective view showing the cash box housing 4, the adaptor frame 14, and a single modular section 20 prior to installation.

As shown in FIG. 4, the cash box housing 10 includes a lid 40 having a handle means 48 to facilitate opening and closing of the lid. The cash box housing 10 includes side flanges 52 provided with slots 54. The lid 40 rotates about the hinge and snaps into place by means of side guide lugs 61 and 62 overlapping the adjacent modular section 20. The lid 40 is shown in the open position in phantom outline.

The adaptor frame 14 includes inwardly facing flanges 80 and outwardly projecting lugs 82. The flanges 80 provide a stop for a spring-loaded bill compressor plate 88 and the lugs 82 engage associated hooks (not shown) on the margin of the open end 18 of the bill validator transport housing 12, to which the adaptor frame 14 may be connected. The adaptor frame 14, in the embodiment shown, includes a plurality of snap elements 86 which may be received in snap-fitted relation with associated snap openings 54 molded into the cash box 10 to provide a connection means between the cash box and the adaptor frame 14 when no modular sections 20 are used to enlarge the capacity of the cash box 10.

The modular sections 20 may be used in any number from one up to seven or more to increase the capacity of the cash box system. As shown, each modular section 20 includes side flanges 52 having a plurality of slots 54, which receive snap-elements 86 of the adaptor frame 14, or the snap elements 86 of an identical modular section 20. The modular section 20 includes a plurality of snap elements 86 which are received within slots 54 of the cash box 10, or within slots 54 of an identical modular section 20.

As shown in FIG. 4, the upper left corner of the cash box lid may include a switch element SW and similarly each modular section 20 includes a switch element SWX. The switch elements overlap the adaptor frame 14 to engage an associated element (not shown) on the bill validator housing 12. The switch elements SW, SWX provide that when the cash box system is placed on a prior art bill validator housing 12, the stacker motor M2 will become operative to drive the bill pusher plate 32. In the switchless system provided herein, the switch elements are not used.

It will be understood that in the embodiment described the motor current characteristic of the stacker motor which is measured is the current draw. However, other motor current characteristics could be used, e.g., voltage drop.

Although the invention has been described by making detailed reference to the preferred embodiments, such detail is to be understood in an instructive rather than in any restrictive sense, many other variants being possible within the scope of the claims hereunto appended.

We claim as our invention:

1. A bill validator having an improved cash box system comprising:

a bill validator including a bill inlet opening and a sensor means associated with the said opening, a bill transport means including an electric motor for transporting a bill to a bill stacking position and a bill stacker means including an electric motor and means for moving the bill from the bill stacking position;

a cash box associated with the bill validator and selectively receiving bills from the bill stacker means; and processing means including measuring means for measuring the current draw of the stacker motor, comparator means for comparing said current draw with a predetermined limit of the current draw, means to permit stacking when said limit is not exceeded and means for setting a fill status condition to selectively prevent stacking when said limit is exceeded, the improvement comprising:

means for repeatedly determining the full status condition by cycling the stacker motor each time the inlet sensor detects a bill in the inlet and the status condition is set to fill.

2. A bill validator having an improved cash box system as defined in claim 1, in which:

when the current draw exceeds the predetermined limit, the status condition is set to ftill without preventing the stacker motor from recycling.

3. A bill validator having an improved cash box system as defined in claim 2, in which:

when the current draw does not exceed the predetermined limit, the status condition is reset to not full.

4. A bill validator and improved cash box system as defined in claim 1, in which:

the cash box is provided with at least one modular section disposed between the bill validator and the cash box for increasing the cash box capacity.

5. An improved method of determining the cash box full condition in a bill validator having a bill receiving opening, bill transporting and stacking motors and a cash box the method comprising the steps of:

placing a bill in a bill receiving inlet;

detecting the presence of the bill and sending a signal to the bill stacker motor;

comparing the current draw of the stacker motor with a predetermined limit of the current draw;

accepting the bill when the limit is not exceeded, transporting the bill to a stacking position and stacking the bill in the cash box, and setting the cash box fill condition to prevent stacking when said limit is exceeded, the improved method comprising:

repeatedly determining the full status condition by cycling the stacker motor each time a bill is placed in the inlet and the status condition is set to full.

6. A method of determining the cash box full condition as defined in claim 5, including an additional step of: increasing the capacity of the cash box by inserting at least one modular section between the bill validator and the cash box.

7. A bill validator having an improved cash box system comprising:

a bill validator including a bill inlet opening and a sensor means associated with the said opening, a bill transport means including an electric motor for transporting a bill to a bill stacking position and a bill stacker means including an electric motor and means for moving the bill from the bill stacking position;

a cash box associated with the bill validator and selectively receiving bills from the bill stacker means; and processing means including measuring means for measuring a motor current characteristic of the stacker motor, comparator means for comparing said characteristic with a predetermined limit of said characteristic, means to permit stacking when said limit is not exceeded and means for setting a full status condition to selectively prevent stacking when said limit is exceeded, the improvement comprising:

means for repeatedly determining the full status condition by cycling the stacker motor each time the inlet sensor detects a bill in the inlet and the status condition is set to full.

\* \* \* \* \*